Oct. 30, 1951 — A. S. VOLPIN — 2,572,894
LUBRICATED PLUG VALVE
Filed Aug. 24, 1945 — 2 SHEETS—SHEET 1

A. S. VOLPIN
INVENTOR.

BY Lester B. Clark
& Ray L. Smith
ATTORNEYS

Oct. 30, 1951      A. S. VOLPIN      2,572,894
LUBRICATED PLUG VALVE
Filed Aug. 24, 1945      2 SHEETS—SHEET 2
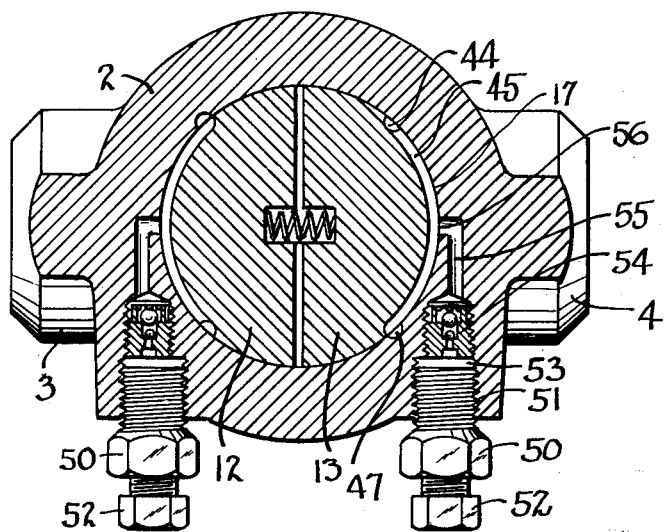
Fig. 3.
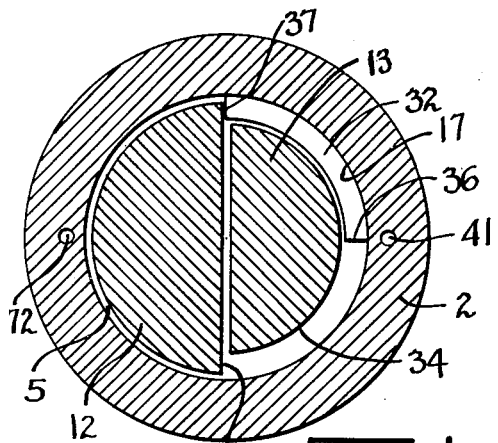
Fig. 4.
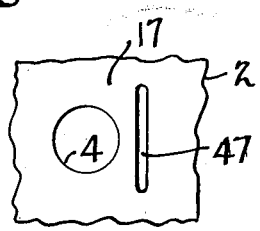
Fig. 5.
Fig. 6.
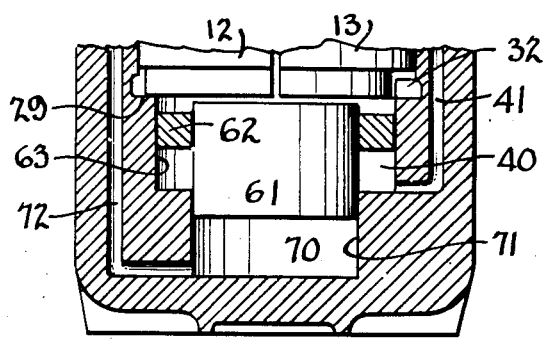
Fig. 7.
A. S. VOLPIN
INVENTOR.
BY Lester B. Clark
+ Ray L. Smith
ATTORNEYS Patented Oct. 30, 1951

2,572,894

UNITED STATES PATENT OFFICE 2,572,894

LUBRICATED PLUG VALVE

Alexander S. Volpin, Houston, Tex.

Application August 24, 1945, Serial No. 612,445

9 Claims. (Cl. 251—93)

The invention relates to a lubricated valve wherein an independent distribution system for sealing material is provided for each the upstream and the downstream ports.

It is one of the objects of the invention to provide a single movable barrier or piston which will apply the line pressure to the distribution system of each the upstream and the downstream ports.

Another object of the invention is to provide a stepped plug chamber for lubricated plug valves so as to provide two independent sealing material reservoirs to which the line pressure may be applied in maintaining a distribution pressure upon the sealing material.

Another object of the invention is to provide a single movable piston or barrier in a lubricated plug valve distribution system so as to create two separate reservoirs upon which pressure is maintained.

Another object of the invention is to provide two independent distribution systems for the upstream and the downstream flow ports of a lubricated plug valve wherein two concentric barriers are subjected to line pressure and capable of independent movement relative to each other in applying pressure to the distribution systems.

Another object is to provide a single stepped barrier for lubricated valves to create two independent reservoirs, each of which may be filled by a separate injection fitting.

Other and further objects of the invention will be readily apparent when the following description is considered in connection with the accompanying drawings, wherein.

Figure 1:
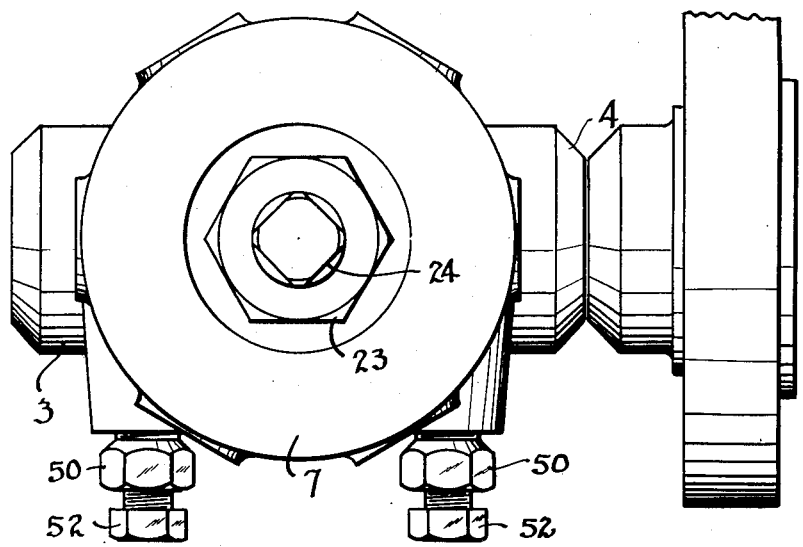
Fig. 1 is a top plan view looking down on the valve constructed in accordance with the invention.
Figure 2:
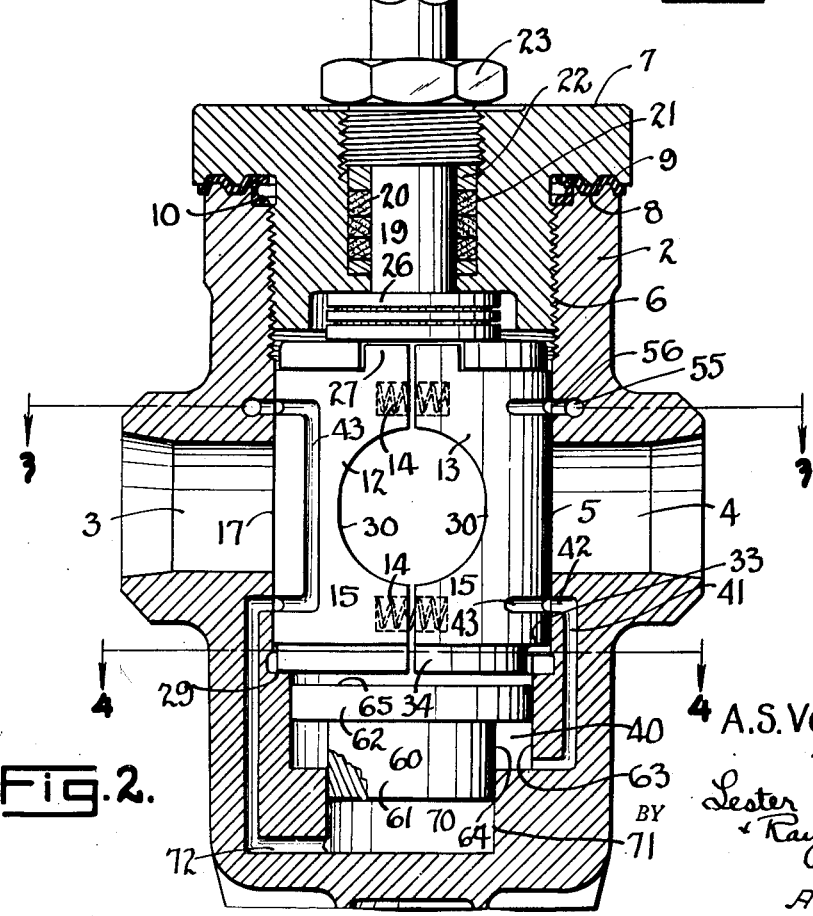
Fig. 2 is a vertical sectional view through the housing and illustrating the plug in side elevation to show the arrangement of the parts.

Figs. 3 and 4 are transverse sectional views taken on the lines 3—3 and 4—4 respectively of Fig. 2;

Fig. 5 is a broken detailed elevation of the flow port and illustrating the distribution groove in the face of the plug valve chamber;

Fig. 6 is a side elevation of one of the plug segments illustrating the three sided distribution groove;

Fig. 7 is a broken detailed sectional view showing a slightly modified piston or barrier made in two parts which are relatively movable so that the line pressure may be independently applied to each the upstream and the downstream flow ports.

The valve is made up of the housing or body 2 which has the flow ports 3 and 4 extending thereinto. Either one of these ports may be used as the upstream or the downstream port so that the valve is known as a 2-way valve. These ports 3 and 4 lead into the valve chamber 5 which is a cylindrical recess in the body threaded at 6 to receive the cap or bonnet 7. In order to seal the bonnet against the body a corrugated surface 8 having a similarly corrugated gasket 9 has been provided. In this manner a more efficient seal is maintained. In order to prevent leakage starting through the gasket a lip type packing 10 is seated in the upper end of the recess or valve chamber 5.

Disposed in the valve chamber are the segments 12 and 13 which form the valve plug. These segments are urged apart by the springs 14 so that the peripheral surface 15 of each of the segments is urged against the wall 17 of the valve chamber 5.

In order to turn the valve segments to open or closed position the valve stem 19 is sealed with the packing 20 in a recess 21 in the cap 7. The packing is held in place with a retainer ring 22 adjustably clamped in place by the gland nut 23. The stem has a non-circular area 24 to receive a tong, wrench or wheel for turning the valve. The lower end of the stem 19 carries a head 26 which is arranged to abut the lugs 27 on each of the plug segments so as to cause turning thereof.

The plug segments are positioned in accurate alignment with the flow ports by resting upon a shoulder 29 in the valve chamber so that the transverse semi-circular recesses 30 will be aligned with the ports when the plug is turned to open position. The shoulder 29 has a raised portion 32 thereon as best seen in Fig. 4, upon which a shoulder 33 on the plug segment 13 will ride to support such segment and the segment 13 is cut away as at 34 so that it may rotate without abutting the raised portion 32, while the inside face 35 of the segment 12 will abut against the end 36 of the raised portion 32 when the valve is in open position and against the shoulder 37 on the other end of the raised portion 32 when the valve is in closed position. This construction limits the turning movement of the valve.

The chamber 5 is reduced in size somewhat by the shoulder 29 to provide a reservoir or chamber 40 having a passage 41 leading therefrom and arranged to discharge at 42 into the plug chamber. The segment 13 has a distribution groove 43 therein as best seen in Fig. 6, which groove is made up of the vertical leg 44 and the top and bottom horizontal legs 45 and 46 respectively. The inlet 42 for sealing material from the reservoir 40 is at the elevation of the lower leg 46 so that such leg is always in contact with the inlet to furnish sealing material.

A vertical distribution groove 47 is arranged in the face 17 of the plug valve chamber and when the valve is in closed position the leg 47 will serve as a connection for the dead ends of the horizontal legs 45 and 46. In this manner the port 4 is completely encircled or enclosed by a rectangular distribution system to provide a complete seal.

In order to introduce lubricant or sealing material into this distribution system a fitting 50 threaded at 51 into the side of the housing is provided. This fitting has a pressure spindle 52 threaded therein to force sealing material into the recess 53. A double check valve assembly 54 is provided to prevent leakage of the line pressure through the valve and the sealing material then passes into a conduit 55 which discharges at 56 into the face 17 of the plug chamber. This discharge 56 is at the elevation of the upper leg 45 of the distribution system so that the sealing material being forced into the system will flush out the grooves 45, 44 and 46, and then enter the passage 41 so that it will be forced into the annular reservoir 40 in the base of the plug chamber.

This reservoir is defined by a piston or barrier 60 which is freely movable in the plug chamber and is made up of the body portion 61 and a flange 62. The flange 62 rides on the periphery 63 of the reservoir 40 while the periphery 64 of the body 61 completes the reservoir 40. The upper surface 65 of the barrier 60 is exposed to line pressure in the plug chamber so that the barrier is constantly forced downwardly by the pressure on the valve so as to maintain a pressure on the sealing material in the distribution groove.

The opposite port 3 is provided with a similar distribution system which is fed from the reservoir 70 formed in the reduced area 71 below the reservoir 40. The outlet passage is shown at 72 and the distribution grooves in the plug segment 12 will be identified by the same reference characters as those applied to the distribution grooves on the plug segment 13.

It will be seen from the foregoing description that two separate and independent distribution systems have been provided, but the pressure for maintaining the sealing material in position for both systems is supplied by the single piston or barrier 60 which simultaneously applies such pressure to the reservoirs 40 and 70 of the respective systems.

Fig. 7 shows a slightly modified form of the invention where the body 61 and the flange 62 are made as separate elements which are independently movable. Except for this variation the construction and operation of the valve embodying the modification of Fig. 7 is identical with that previously described.

Broadly the invention contemplates a lubricated plug valve where independent reservoirs for sealing material are created in the plug chamber by a piston or barrier which separates the reservoirs while maintaining line pressure upon both of them.

What is claimed is:

1. A lubricated plug valve comprising, a body, a valve chamber therein, a flow passage in the body across said chamber, a plug rotatable in said chamber to open or close the passage, a passage port at each side of said chamber, separate distribution grooves for each of said ports, an inlet fitting to force sealing material into each of said grooves, a pair of sealing material reservoirs in said body each of which is connected to one of said grooves, and a single member slidable in said chamber in response to line pressure thereon to force sealing material from both of said reservoirs.

2. A lubricated plug valve comprising, a body, a valve chamber therein, a flow passage in the body across said chamber, a plug rotatable in said chamber to open or close the passage, a passage port at each side of said chamber, separate distribution grooves for each of said ports, an inlet fitting to force sealing material into each of said grooves, a pair of sealing material reservoirs in said body each of which is connected to one of said grooves, and a single member slidable in said chamber in response to line pressure thereon to force sealing material from both of said reservoirs, said member being also slidable in refilling said reservoirs in response to the pressure of the incoming sealing material.

3. In a lubricated plug valve having a body, a plug chamber therein and a plug in said chamber, the combination of a stepped extension of said chamber, a stepped barrier movable therein so as to form two independent sealing material reservoirs, and a pair of distribution groove systems each connected to one of said reservoirs, one of said systems being disposed at each the upstream and the downstream sides of said valve.

4. In a lubricated plug valve having a body, a plug chamber therein and a plug in said chamber, the combination of a stepped extension of said chamber, a stepped barrier movable therein so as to form two independent sealing material reservoirs, a distribution groove system connected to each of said reservoirs, one of said systems being disposed at the upstream and one at the downstream side of said valve, and separate means to inject sealing material into each of said systems and thence to the respective reservoirs.

5. In a lubricated plug valve having a body, a plug chamber therein and a plug in said chamber, the combination of a stepped extension of said chamber, a stepped barrier movable therein so as to form two independent sealing material reservoirs, and a distribution groove system connected to each of said reservoirs, one of said systems being disposed at the upstream and one at the downstream side of said valve, said barrier being exposed to the line pressure on the valve so as to simultaneously apply such pressure to the sealing material in each of said reservoirs.

6. In a lubricated plug valve having a body, a plug chamber therein and a plug in said chamber, the combination of a stepped extension of said chamber, a pair of independent barriers movable therein so as to form two independent sealing material reservoirs, and a distribution groove system connected to each of said reservoirs, one of said systems being disposed at the upstream and one at the downstream side of said valve.

7. In a lubricated plug valve having a body, a plug chamber therein and a plug in said chamber, the combination of a stepped extension of said chamber, a pair of independent barriers movable therein so as to form two independent sealing material reservoirs, and a distribution groove system connected to each of said reservoirs, one of said systems being disposed at the upstream and one at the downstream side of said valve, each of said barriers being exposed to line pressure.

8. In a lubricated plug valve a body, a plug chamber therein, an extension of said chamber below said plug chamber, a step shoulder in said extension to provide a reduced bore in the lower part of said extension, barrier means fitted and slidable in said extension and said bore to create two independent sealing material reservoirs, one in said extension and one in said bore, said barrier means being movable by line pressure leaking into said plug chamber, a distribution groove at each the upstream and the downstream sides of said valve passage, means to connect one reservoir with a distribution groove at the upstream side of the valve and another passage means to connect the other reservoir with the downstream groove so that line pressure on the barrier means will displace sealing material from the reservoirs to said grooves.

9. In a lubricated plug valve a body, a plug chamber therein, an extension of said chamber below said plug chamber, a step shoulder in said extension to provide a reduced bore in the lower part of said extension, barrier means fitted and slidable in said extension and said bore to create two independent sealing material reservoirs, one in said extension and one in said bore, said barrier means being movable by line pressure leaking into said plug chamber, a distribution groove at each the upstream and the downstream sides of said valve passage, means to connect one reservoir with a distribution groove at the upstream side of the valve and another passage means to connect the other reservoir with the downstream groove so that line pressure on the barrier means will displace sealing material from the reservoirs to said grooves, and additional means to inject sealing material from the exterior of the body to each of the grooves, passage means and reservoirs.

ALEXANDER S. VOLPIN.

REFERENCES CITED

The following references are of record in the file of this patent:

UNITED STATES PATENTS

| Number | Name | Date |
|---|---|---|
| 1,403,756 | Farmer | Jan. 17, 1922 |
| 1,998,029 | Simpson | Apr. 16, 1935 |
| 2,269,887 | Sharp | Jan. 13, 1942 |
| 2,299,517 | Volpin | Oct. 20, 1942 |

FOREIGN PATENTS

| Number | Country | Date |
|---|---|---|
| 494,261 | Germany | of 1930 |